(12) United States Patent  (10) Patent No.: US 7,492,373 B2
Junkins  (45) Date of Patent: Feb. 17, 2009

(54) REDUCING MEMORY BANDWIDTH TO TEXTURE SAMPLERS VIA RE-INTERPOLATION OF TEXTURE COORDINATES

(75) Inventor: Stephen Junkins, Bend, OR (US)

(73) Assignee: Intel Corporation, Santa Clara, CA (US)

( * ) Notice: Subject to any disclaimer, the term of this patent is extended or adjusted under 35 U.S.C. 154(b) by 423 days.

(21) Appl. No.: 11/209,287

(22) Filed: Aug. 22, 2005

(65) Prior Publication Data

US 2007/0040844 A1  Feb. 22, 2007

(51) Int. Cl.
*G09G 5/00* (2006.01)
*G06T 11/40* (2006.01)
*G06T 12/00* (2006.01)
*G06K 9/32* (2006.01)
*G06K 9/60* (2006.01)

(52) U.S. Cl. ............ 345/582; 345/606; 345/614; 345/552; 345/572; 382/293; 382/300; 382/305

(58) Field of Classification Search ......... 345/581–582, 345/588, 606, 612–614, 543, 552, 556, 564–565, 345/572–574, 501–502; 382/285, 293, 300, 382/305; 358/521, 525; 711/100, 200
See application file for complete search history.

(56) References Cited

U.S. PATENT DOCUMENTS

| 6,288,730 B1 * | 9/2001 | Duluk et al. ............... 345/552 |
| 6,714,196 B2 * | 3/2004 | McCormack et al. ....... 345/423 |
| 6,788,303 B2 * | 9/2004 | Baldwin .................... 345/522 |
| 6,975,320 B1 * | 12/2005 | Bentz ....................... 345/428 |
| 2003/0169271 A1 * | 9/2003 | Emberling et al. ......... 345/582 |
| 2005/0046628 A1 | 3/2005 | Hux et al. |
| 2006/0232596 A1 * | 10/2006 | Barenburg et al. ......... 345/581 |

OTHER PUBLICATIONS

U.S. Appl. No. 11/108,989, filed Apr. 18, 2005; Inventor: Stephen Junkins.
U.S. Appl. No. 10/881,668, filed Jun. 29, 2004; Inventor Stephen Junkins.
U.S. Appl. No. 11/229,276, filed Sep. 16, 2005; Inventor: Stephen Junkins.

* cited by examiner

*Primary Examiner*—Wesner Sajous
(74) *Attorney, Agent, or Firm*—Trop, Pruner & Hu, P.C.

(57) ABSTRACT

Apparatus, systems and methods for reducing memory bandwidth to texture samplers via re-interpolation of texture coordinates includes at least one texture sampler coupled to at least one shader core where the texture sampler is at least capable of generating texture map addresses by re-interpolating pixel fragment block texture coordinates from starting data and attribute deltas associated with the block.

17 Claims, 3 Drawing Sheets

REDUCING MEMORY BANDWIDTH TO TEXTURE SAMPLERS VIA RE-INTERPOLATION OF TEXTURE COORDINATES

BACKGROUND 3D graphics rendering has been implemented extensively in a variety of hardware (HW) architectures over the past few decades. With the advent of standardized rendering application programming interfaces (APIs) such as OpenGL and DirectX, a similar macro architectural structure has begun to emerge. The details and performance of any particular graphics HW architecture often hinges upon how quickly that architecture can retrieve and filter two or more textures when shading a given pixel or block of pixel fragments. For instance, some modern graphics architectures include eight or more pixels processing units to handle pixel shading and thus may require the processing of large numbers of texture memory access and filtering operations in a substantially parallel manner.

One way to minimize bandwidth usage during texture sampling is to process multiple, contiguous pixel fragments simultaneously as pixel fragment blocks. Because contiguous pixel fragments are more likely to sample the same texture coordinates, the use of fragment block processing may significantly reduce bandwidth requirements by avoiding redundant texture memory accesses. However, typical fragment block processing still requires significant bandwidth capacity for conveying the coordinates of all the block's fragments to the texture sampling unit.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description specific details are set forth such as particular structures, architectures, interfaces, techniques, etc. in order to provide a thorough understanding of the various aspects of the claimed invention. However, such details are provided for purposes of explanation and should not be viewed as limiting. Moreover, it will be apparent to those skilled in the art, having the benefit of the present disclosure, that the various aspects of the invention claimed may be practiced in other examples that depart from these specific details. In certain instances, descriptions of well known devices, circuits, and methods are omitted so as not to obscure the description of the present invention with unnecessary detail.

Figure 1:
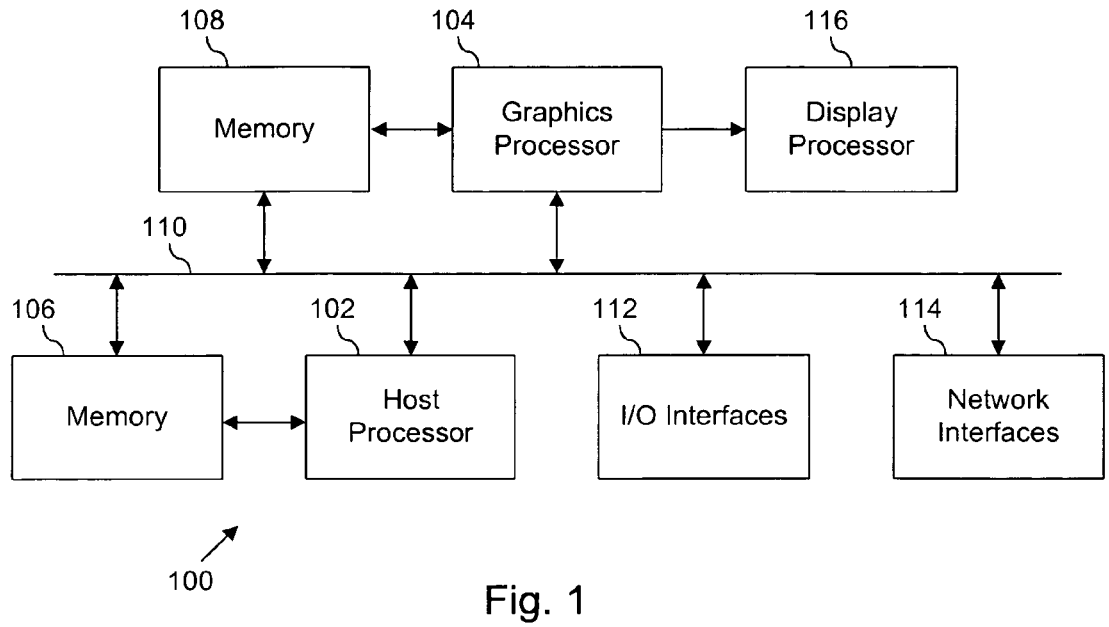
FIG. 1 illustrates an example graphics processing system.

FIG. 1 illustrates an example system 100 according to an implementation of the invention. System 100 may include a host processor 102, a graphics processor 104, memories 106 and 108 (e.g., dynamic random access memory (DRAM), static random access memory (SRAM), flash, etc.), a bus or communications pathway(s) 110, input/output (I/O) interfaces 112 (e.g., universal synchronous bus (USB) interfaces, parallel ports, serial ports, telephone ports, and/or other I/O interfaces), network interfaces 114 (e.g., wired and/or wireless local area network (LAN) and/or wide area network (WAN) and/or personal area network (PAN), and/or other wired and/or wireless network interfaces), and a display processor and/or controller 116. System 100 may be any system suitable for processing 3D graphics data and providing that data in a rasterized format suitable for presentation on a display device (not shown) such as a liquid crystal display (LCD), or a cathode ray tube (CRT) display to name a few examples.

System 100 may assume a variety of physical implementations. For example, system 100 may be implemented in a personal computer (PC), a networked PC, a server computing system, a handheld computing platform (e.g., a personal digital assistant (PDA)), a gaming system (portable or otherwise), a 3D capable cell phone, etc. Moreover, while all components of system 100 may be implemented within a single device, such as a system-on-a-chip (SOC) integrated circuit (IC), components of system 100 may also be distributed across multiple ICs or devices. For example, host processor 102 along with components 106, 112, and 114 may be implemented as multiple ICs contained within a single PC while graphics processor 104 and components 108 and 116 may be implemented in a separate device such as a television coupled to host processor 102 and components 106, 112, and 114 through communications pathway 110.

Host processor 102 may comprise a special purpose or a general purpose processor including any processing logic, hardware, software and/or firmware, capable of providing graphics processor 104 with 3D graphics data and/or instructions. Processor 102 may perform a variety of 3D graphics calculations such as 3D coordinate transformations, etc. the results of which may be provided to graphics processor 104 over bus 110 and/or that may be stored in memories 106 and/or 108 for eventual use by processor 104.

In one implementation, host processor 102 may be capable of performing any of a number of tasks that support 3D graphics processing. These tasks may include, for example, although the invention is not limited in this regard, providing 3D scene data to graphics processor 104, downloading microcode to processor 104, initializing and/or configuring registers within processor 104, interrupt servicing, and providing a bus interface for uploading and/or downloading 3D graphics data. In alternate implementations, some or all of these functions may be performed by processor 104. While system 100 shows host processor 102 and graphics processor 104 as distinct components, the invention is not limited in this regard and those of skill in the art will recognize that processors 102 and 104 possibly in addition to other components of system 100 may be implemented within a single IC where processors 102 and 104 may be distinguished by the respective types of 3D graphics processing that they implement.

Graphics processor 104 may comprise any processing logic, hardware, software, and/or firmware, capable of processing graphics data. In one implementation, graphics processor 104 may implement a 3D graphics hardware architecture capable of processing graphics data in accordance with one or more standardized rendering application programming interfaces (APIs) such as OpenGL 2.0 and DirectX 9.0 to name a few examples, although the invention is not limited in this regard. Graphics processor 104 may process 3D graphics data provided by host processor 102, held or stored in memories 106 and/or 108, and/or provided by sources external to system 100 and obtained over bus 110 from interfaces 112 and/or 114. Graphics processor 104 may receive 3D graphics data in the form of 3D scene data and process that data to provide image data in a format suitable for conversion by display processor 116 into display-specific data. In addition, graphics processor 104 may include a variety of 3D graphics processing components such as one or more rasterizers coupled to one or more shader cores and associated texture samplers as will be described in greater detail below.

Bus or communications pathway(s) 110 may comprise any mechanism for conveying information (e.g., graphics data, instructions, etc.) between or amongst any of the elements of system 100. For example, although the invention is not limited in this regard, communications pathway(s) 110 may comprise a multipurpose bus capable of conveying, for example, instructions (e.g., macrocode) between processor 102 and processor 104. Alternatively, pathway(s) 110 may comprise a wireless communications pathway.

Display processor 116 may comprise any processing logic, hardware, software, and/or firmware, capable of converting image data supplied by graphics processor 104 into a format suitable for driving a display (i.e., display-specific data). For example, while the invention is not limited in this regard, processor 104 may provide image data to processor 116 in a specific color data format, for example in a compressed red-green-blue (RGB) format, and processor 116 may process such RGB data by generating, for example, corresponding LCD drive data levels etc. Although FIG. 1 shows processors 104 and 116 as distinct components, the invention is not limited in this regard, and those of skill in the art will recognize that some if not all of the functions of display processor 116 may be performed by processor 104.

Figure 2:
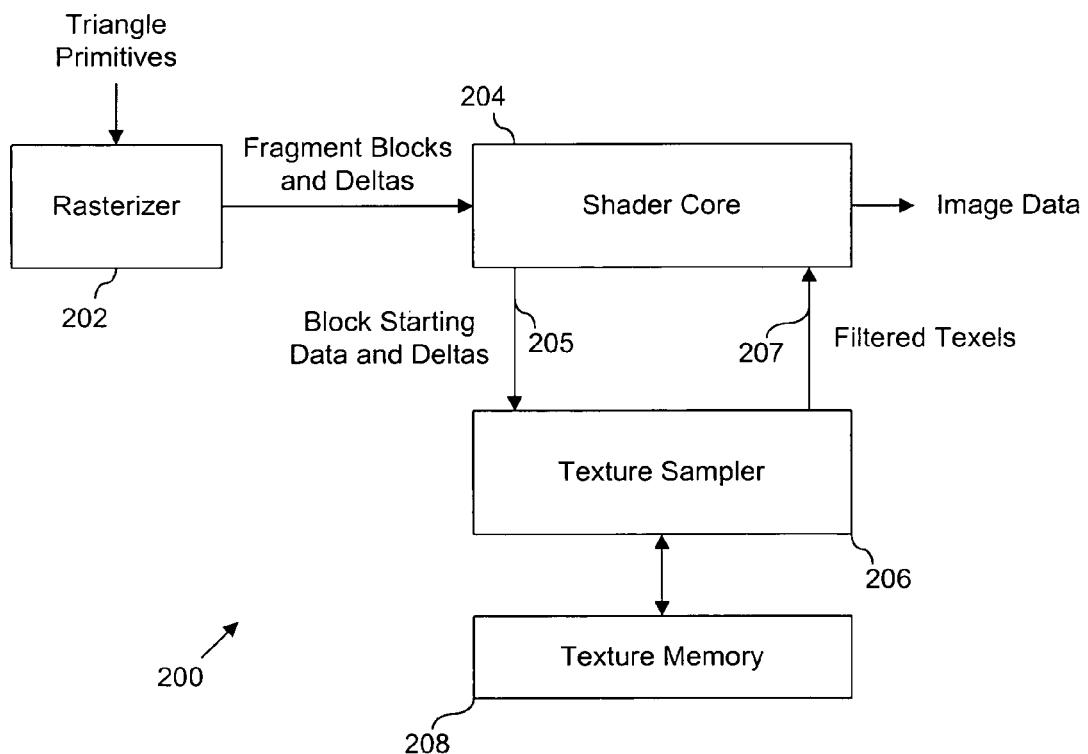
FIG. 2 illustrates a portion of the graphics processor of the system of FIG. 1 in more detail.

FIG. 2 is a simplified block diagram of portions of a graphics processor 200, such as processor 104, in accordance with an implementation of the claimed invention. Processor 200 may include a rasterizer 202, one or more shader cores 204, a texel request bus 205, a texture sampler 206, a texel output bus 207, and texture memory 208. Those skilled in the art will recognize that some components typically found in graphics processors (e.g., tessellation module, triangle setup module etc.) and not particularly germane to the claimed invention have been excluded from FIG. 2 so as not to obscure implementations of the invention. Moreover, while FIG. 2 illustrates one rasterizer 202, one shader core 204, and one texture sampler 206, those skilled in the art will recognize that more than one rasterizer and/or shader core and/or texture sampler may be implemented without departing from the scope and spirit of the claimed invention.

Rasterizer 202 may be capable of processing triangle primitives provided by a triangle setup module (not shown) to generate individual pixel fragments (and/or "rasters"). In doing so, rasterizer 202 may generate fragment attributes for each pixel encountered in traversing a given triangle by interpolating triangle vertex coordinates (e.g., vertex UV texture coordinates) using gradients or attribute deltas associated with the vertices of that triangle. For example, attribute deltas for two-dimensional texture coordinates may include dU/dx, dU/dy, dV/dx and dV/dy where U and V are two-dimensional texture space coordinates, and x and y are two-dimensional texture map coordinates. However, the invention is not limited in this regard and rasterizer 202 may generate attribute deltas using other texture coordinate spaces, such as three-dimensional texture coordinate spaces.

Rasterizer 202 may generate fragments in the form of N×M fragment blocks comprising contiguous and/or continuous regions of fragments (e.g., blocks comprising eight contiguous pixel fragments) where N and M are both integers and either index may range from 1 to 16 or more. The invention is not limited by the precise nature of the fragment blocks and fragment blocks generated by rasterizer 202 may assume a variety of sizes and shapes including 1×4, 2×2, 2×4, 1×8, 1×16, 2×8 and 4×4 rectangular blocks, to name a few examples. Rasterizer 202 may provide pixel fragment blocks, and/or block starting data and/or associated attribute deltas to shader core 204. Rasterizer 202 may comprise any graphics processing logic and/or hardware, software, and/or firmware, capable of performing triangle interpolation techniques to generate fragment blocks and/or attribute deltas.

Shader core 204 may comprise any graphics processing logic and/or hardware, software, and/or firmware, capable of receiving fragment block and associated attribute deltas from rasterizer 202 and, in response, providing texture read requests to texture sampler 206 over input texel request bus 205. In accordance with the invention the texture read requests provided to sampler 206 may comprise fragment block starting data and attribute deltas associated with a particular pixel fragment block. For example, shader core 204 may receive a fragment block and associated attribute deltas from rasterizer 202, and may, in response generate fragment block start data. While those skilled in the art will recognize that shader cores often undertake other processes such as implementing per pixel shading routines, such added functionality is outside the scope of the invention and thus will not be discussed further.

Texture sampler 206 may comprise any graphics processing logic and/or hardware, software, and/or firmware, capable of receiving texture read requests from shader core 204, and, in response to the read requests, capable of obtaining texels from a texture map stored in texture memory 208. In accordance with the invention, sampler 206 may use the fragment block starting data and attribute deltas provided in the read requests to re-interpolate the texture coordinates locally in sampler 206. Sampler 206 may then use the re-interpolated texture coordinates to generate addresses suitable for retrieving texture data (i.e., raw texels) associated with those re-interpolated texture coordinates from texture memory 208. Sampler 206 may also filter the raw texels obtained from memory 208 using conventional filtering techniques (e.g., bilinear, trilinear and/or anisotropic filtering) and provide filtered texels to core 204 over texel output bus 207.

Shader core 204 may perform additional graphics operations on the filtered texels obtained from sampler 206. The invention is not limited in this regard however and those skilled in the art will recognize that a large variety of manipulations of filtered texels may be undertaken by shader core 204 including, but not limited to: per pixel lighting effects, animated textures, etc.

Texture memory 208 may comprise any memory device or mechanism suitable for storing and/or holding raw texel data (e.g., in the form of a 2D texture map). For example, memory 208 may comprise memory 108 of system 100.

Figure 3:
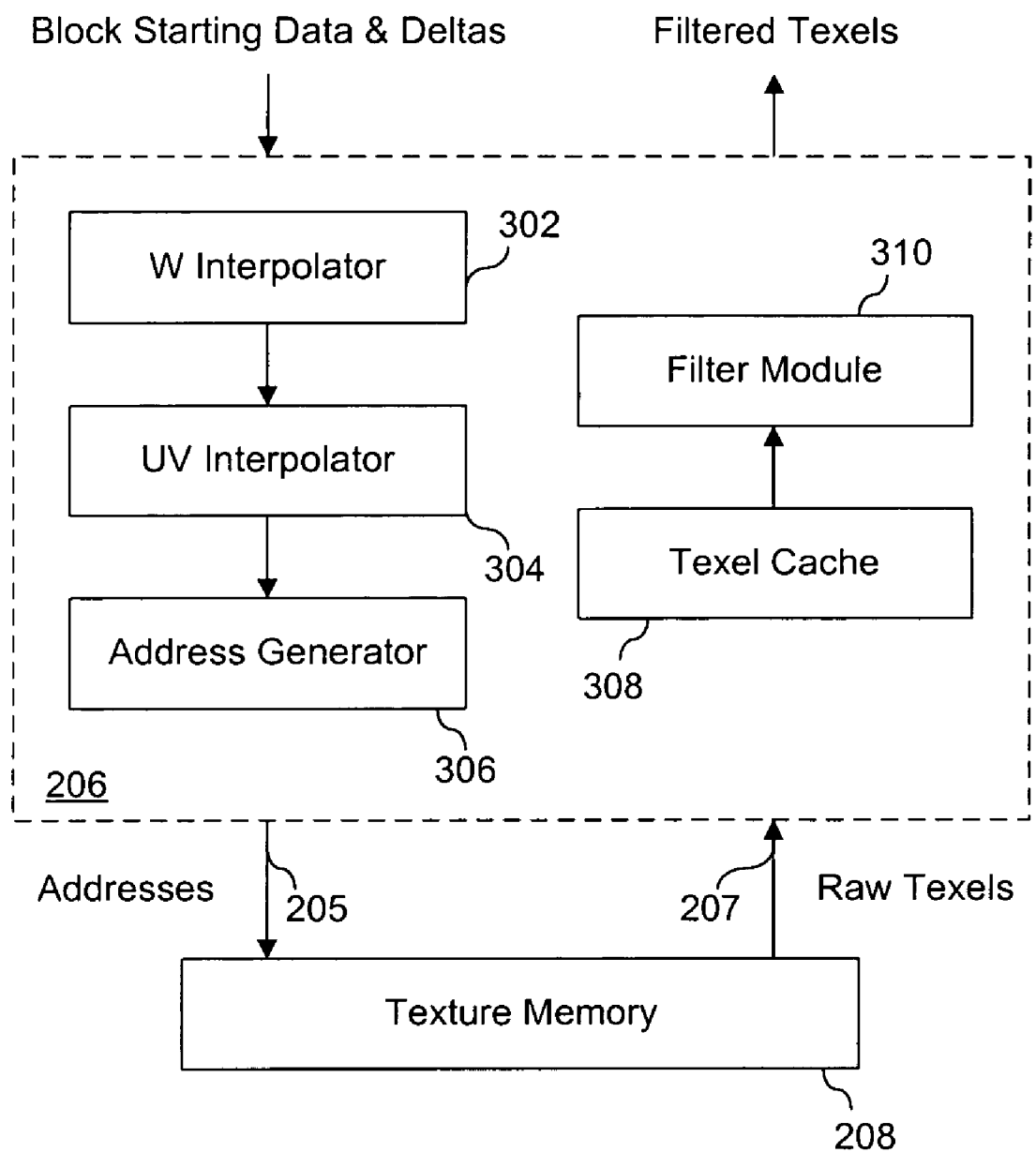
FIG. 3 illustrates a portion of the graphics processor of FIG. 2 in more detail.

FIG. 3 is a simplified block diagram showing portions of texture sampler 206 of graphics processor 200 in greater detail in accordance with an implementation of the claimed invention. Sampler 206 may include W interpolator 302, a UV interpolator 304, an address generator 306, a texel cache 308, and a filter module 310. Those skilled in the art will recognize that sampler 206 may include additional elements or features typically included in texture samplers, however, such features have been excluded from FIG. 3 so as not to obscure the invention.

W interpolator 302 and UV interpolator 304 may comprise graphics processing logic and/or hardware, software, and/or firmware solutions for texture UV coordinate generation typically implemented in a rasterizer. However, in accordance with the invention, W interpolator 302 and UV interpolator 304 may be implemented in texture sampler 206. When implemented in sampler 206, a reduction in the bandwidth of texture read requests may be obtained. For example, in a typical graphics processing system each texel read request for an 8 fragment block of 2D, 4-byte texture coordinates comprises 64 bytes of read request data. In contrast, and in accordance with the invention, sampler 206 may, for an 8 fragment, 2D block, receive a texel read request comprising eight, 4-byte texture attribute deltas and three, 4-byte block starting points for a total of 36 bytes of read request data. Subsequently, in accordance with the invention, interpolators 302 and/or 304 of sampler 206 may use the starting point and attribute delta data to re-interpolate the texture coordinates.

Address generator 306 may receive re-interpolated texture coordinates from UV interpolator 306 and in response may generate corresponding texture map addresses. Sampler 206 may then use those addresses to access the corresponding raw textures stored and/or held in memory 208.

Those skilled in the art will recognize that texel cache 308 and filter module 310 may comprise conventional graphics processing mechanisms and have been included in FIG. 3 in the interest of completeness. Accordingly, these features will not be discussed in any greater detail.

Figure 4:
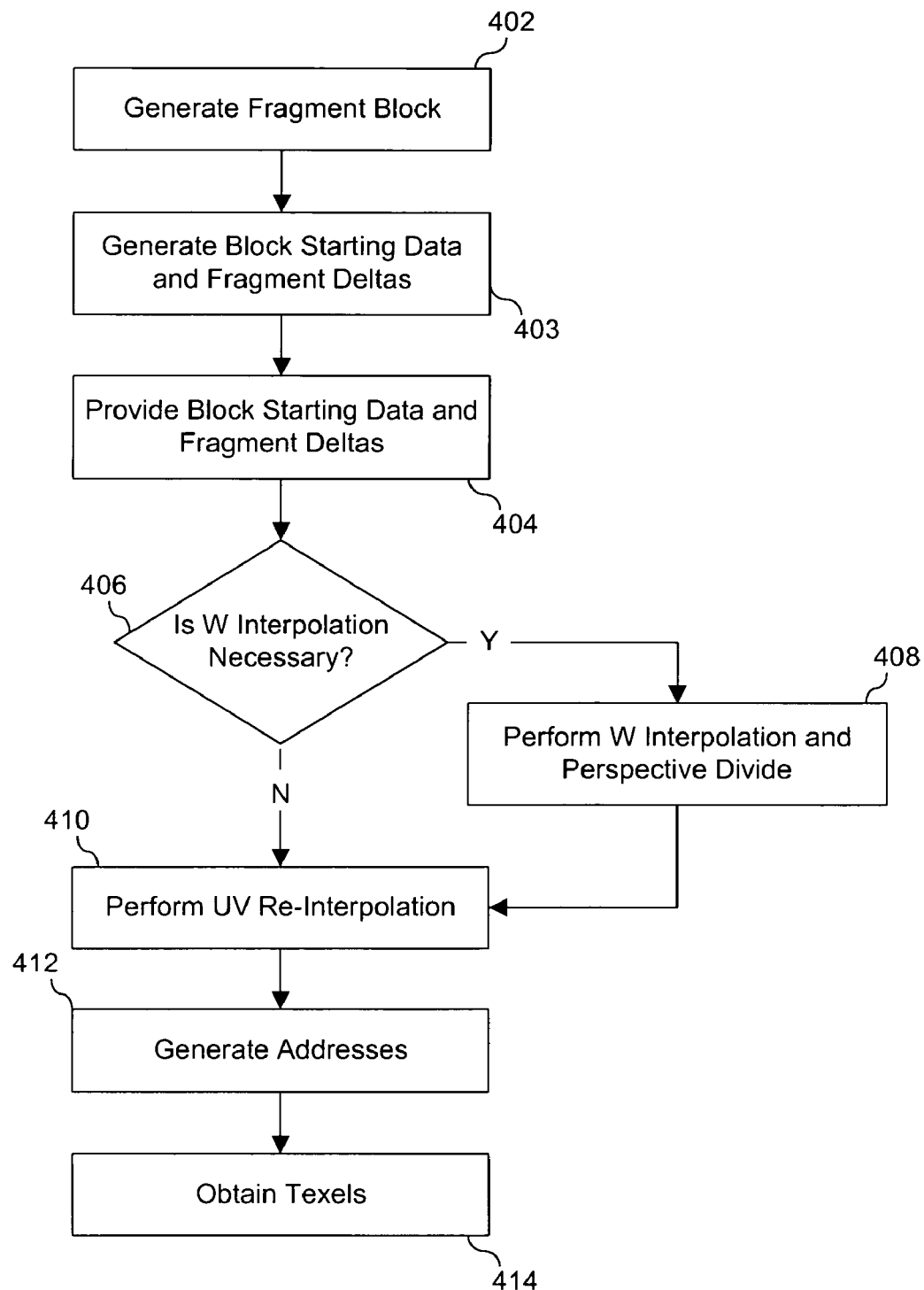
FIG. 4 is a flow chart illustrating an example process for reducing memory bandwidth to texture samplers via re-interpolation of texture coordinates.

FIG. 4 is a flow chart illustrating a process 400 for reducing memory bandwidth to texture samplers via re-interpolation of texture coordinates in accordance with an implementation of the invention. While, for ease of explanation, process 400, and associated processes, may be described with regard to system 100 of FIG. 1, processor 200 of FIG. 2, and sampler 206 of FIGS. 2 and 3, the claimed invention is not limited in this regard and other processes or schemes supported by appropriate devices in accordance with the claimed invention are possible.

Process 400 may begin with the generation of a fragment block [act 402]. In one implementation, rasterizer 202 may generate a fragment block according to conventional triangle processing procedures. For example, rasterizer 202 may generate a fragment block using a conventional process of "scan" converting triangle based primitives (specified in "vertice" or "object" space) into blocks of discrete pixel fragments (specified in "screen" or "display" space).

Process 400 may continue with the generation of fragment block starting data and fragment attribute deltas [act 403]. In one implementation, rasterizer 202 may generate the fragment block starting data and fragment attribute deltas associated with the fragment block generated in act 402. The block starting data may comprise the starting texture coordinates for the block generated in act 402, while the attribute deltas may comprise gradients for the texture coordinates associated with the starting texture coordinates for a given block. Those skilled in the art will recognize that the specific block structure utilized (e.g., 2×4, 1×8, 2×8, etc.) will determine the exact nature of the attribute deltas. As a design parameter the block structure affords considerable latitude with respect to possible implementations and the invention is not limited to a specific block structure.

Process 400 may continue with the provision of the block starting data and fragment attribute deltas [act 404]. In one implementation, rasterizer 202 may provide this data to shader core 204 which, in turn, may provide this data to texture sampler 206 over texel read request bus 205 in the process of core 204 shading and/or processing the fragment block generated in act 402. Process 400 may then continue with an assessment of whether a W interpolation and perspective divide is necessary for the block being processed [act 406]. For example, a flag and/or indicator associated with the block being processed and set and/or reset by a mechanism (not shown) associated with sampler 206 may indicate whether or not a W interpolation and perspective divide needs to be undertaken. If the result of assessment 406 is positive then W interpolator 302 may undertake a W interpolation and perspective divide using the fragment block starting data and fragment attribute deltas according to conventional W interpolation and perspective divide procedures [act 408]. If the result of assessment 406 is negative then process 400 may proceed without undertaking act 408.

Process 400 may then continue with the performance of a UV re-interpolation [act 410]. In one implementation, UV interpolator 410 of sampler 206 may perform the UV re-interpolation using the fragment block starting data and fragment attribute deltas to generate a full set of texture coordinates for the fragment block being processed. In other words, UV interpolator 410 may use the starting texture coordinates (block starting data) and the associated coordinate gradients (attribute deltas) to re-interpolate the texture coordinates for the block being processed.

Process 400 may then continue with the generation of texture map addresses associated with the re-interpolated texture coordinates [act 412]. One way to so this is to have address generator 306 generate the texture map addresses in response to the re-interpolated texture coordinates provided by UV interpolator 304. Process 400 may conclude with the procurement of the raw texels indicated by those addresses [act 414]. In one implementation, sampler 206 may use those addresses generated in act 412 to access raw texels from texture memory 208.

The acts shown in FIG. 4 need not be implemented in the order shown; nor do all of the acts necessarily need to be performed. Also, those acts that are not dependent on other acts may be performed in parallel with the other acts. Further, at least some of the acts in this figure may be implemented as instructions, or groups of instructions, implemented in a machine-readable medium.

The foregoing description of one or more implementations consistent with the principles of the invention provides illustration and description, but is not intended to be exhaustive or to limit the scope of the invention to the precise form disclosed. Modifications and variations are possible in light of the above teachings or may be acquired from practice of various implementations of the invention. For example, while FIGS. 2 and 3 and the accompanying text may show and describe a graphics processor including one rasterizer, one shader, and one texture sampler, those skilled in the art will recognize that graphics processors in accordance with the invention may include more than one rasterizer and/or shader core and/or texture sampler. Clearly, many other implementations may be employed to provide rasterizer driven cache coherency consistent with the claimed invention.

No element, act, or instruction used in the description of the present application should be construed as critical or essential to the invention unless explicitly described as such. Also, as used herein, the article "a" is intended to include one or more items. Moreover, when terms or phrases such as "coupled" or "responsive" or "in communication with" are used herein or in the claims that follow, these terms are meant to be interpreted broadly. For example, the phrase "coupled to" may refer to being communicatively, electrically and/or operatively coupled as appropriate for the context in which the phrase is used. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A computer-implemented method comprising:
    generating a block of pixel fragments;
    a processor configured to generating block starting data and attribute deltas associated with the block; and
    generating texture coordinates in response to the block starting data and attribute deltas by re-interpolating the texture coordinates.

2. The claim of method 1, wherein the re-interpolation of the texture coordinates is performed by a texture sampler.

3. The method of claim 1, wherein re-interpolating the texture coordinates includes performing a W interpolation and a perspective divide.

4. The method of claim 1, wherein the block starting data comprises starting texture coordinates of the block, and wherein the attribute deltas comprise texture coordinate gradients of the block.

5. The method of claim 4, wherein the texture coordinates comprise either two-dimensional or three-dimensional texture coordinates.

6. An apparatus comprising:
    a rasterizer at least capable of generating a block of pixel fragments, the rasterizer also at least capable of generating starting data and attribute deltas associated with the block;
    a shader core in communication with the rasterizer; and
    a texture sampler in communication with the shader core, the texture sampler at least capable of generating texture map addresses in response to the starting data and attribute deltas associated with the block, wherein the texture sampler generates texture map addresses by re-interpolating texture coordinates using the starting data and attribute deltas.

7. The apparatus of claim 6, wherein the starting data and attribute deltas comprise starting texture coordinates and texture coordinate gradients respectively.

8. The apparatus of claim 6, wherein the texture sampler re-interpolates the texture coordinates by performing a W interpolation and a perspective divide.

9. The apparatus of claim 6, wherein the texture sampler is coupled to the shader core by at least an input texel request bus.

10. The apparatus of claim 9, wherein the texture sampler generates the texture map addresses in response to a texel read request conveyed from the shader core to the texture sampler over the input texel request bus, the texel read request including the starting data and attribute deltas.

11. The apparatus of claim 6, further comprising a memory coupled to the texture sampler, the memory to store a texture map comprising raw texels associated with the texture map addresses, wherein the memory is at least capable of providing the raw texels to the texture sampler in response to the texture map addresses.

12. A system comprising:
    at least one texture sampler in communication with at least one shader core, the texture sampler at least capable of generating texture map addresses in response to starting data and attribute deltas associated with a block of pixel fragments;
    memory in communication with the texture sampler, the memory at least capable of providing texel data in response to the texture map addresses;
    a display processor in communication with the shader core, the display processor at least capable of displaying image data resulting, at least in part, from shading the texel data; and
    a rasterizer coupled to the shader core, the rasterizer at least capable of generating the starting data and attribute deltas.

13. The system of claim 12, wherein the starting data and attribute deltas comprise starting texture coordinates and texture coordinate gradients respectively.

14. The system of claim 12, wherein the texture sampler generates texture map addresses by re-interpolating texture coordinates using the starting data and attribute deltas.

15. The system of claim 14, wherein the texture sampler re-interpolates texture coordinates at least in pan by performing a W interpolation and a perspective divide.

16. The system of claim 12, wherein the texture sampler is coupled to the shader core by at least an input texel request bus.

17. The system of claim 16, wherein the texture sampler generates the texture map addresses in response to a texel read request conveyed from the shader core to the texture sampler over the input texel request bus, the texel read request including the starting data and attribute deltas.

* * * * *

UNITED STATES PATENT AND TRADEMARK OFFICE
CERTIFICATE OF CORRECTION

PATENT NO. : 7,492,373 B2  
APPLICATION NO. : 11/209287  
DATED : February 17, 2009  
INVENTOR(S) : Stephen Junkins It is certified that error appears in the above-identified patent and that said Letters Patent is hereby corrected as shown below:

Col. 8:  
Line 38, "pan" should be --part--.

Signed and Sealed this  
Twenty-third Day of October, 2012

David J. Kappos  
*Director of the United States Patent and Trademark Office*